US010080122B2

(12) United States Patent
Visweswara et al.

(10) Patent No.: US 10,080,122 B2
(45) Date of Patent: Sep. 18, 2018

(54) RECEIVER, TRANSCEIVER, TRANSCEIVER MODULE FOR A BODY COUPLED COMMUNICATION DEVICE, A BODY COUPLED COMMUNICATION SYSTEM AND A METHOD OF WAKING-UP A BODY COUPLED RECEIVER OF A BODY COUPLED COMMUNICATION DEVICE

(71) Applicant: KONINKLIJKE PHILIPS N.V., Eindhoven (NL)

(72) Inventors: Ashoka Sathanur Visweswara, Eindhoven (NL); Anteneh Alemu Abbo, Eindhoven (NL); Sotir Filipov Ouzounov, Eindhoven (NL); Johan-Paul Marie Gerard Linnartz, Eindhoven (NL); Ronald Van Langevelde, Waalre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/781,628

(22) PCT Filed: Apr. 3, 2014

(86) PCT No.: PCT/EP2014/056632
§ 371 (c)(1),
(2) Date: Oct. 1, 2015

(87) PCT Pub. No.: WO2014/161912
PCT Pub. Date: Oct. 9, 2014

(65) Prior Publication Data
US 2016/0050516 A1    Feb. 18, 2016

(30) Foreign Application Priority Data
Apr. 4, 2013  (EP) ..................... 13162253

(51) Int. Cl.
*H04W 4/80* (2018.01)
*H04B 13/00* (2006.01)
(Continued)

(52) U.S. Cl.
CPC ............ *H04W 4/80* (2018.02); *H04B 13/005* (2013.01); *H04W 4/008* (2013.01);
(Continued)

(58) Field of Classification Search
CPC .................................................. H04B 13/005
See application file for complete search history.

(56) References Cited

U.S. PATENT DOCUMENTS

| 5,621,412 A | 4/1997 | Sharpe |
| 5,790,946 A | 8/1998 | Rotzoll |

(Continued)

FOREIGN PATENT DOCUMENTS

| JP | 59058930 | 4/1984 |
| JP | 61281629 | 12/1986 |

(Continued)

OTHER PUBLICATIONS

NFC Forum (Jul. 7, 2010).*
(Continued)

*Primary Examiner* — Cindy Trandai
(74) *Attorney, Agent, or Firm* — Larry Liberchuk

(57) ABSTRACT

A receiver module (101), transceiver module for body coupled communication devices (100) and a method of waking-up a body coupled receiver of a body coupled communication device (100) are provided. The receiver module (101) of the body coupled communication device (100) comprises couplers (102) for receiving signals via a body transmission channel (160) which follows a body of a user (150). A wake-up receiver (108) and a main receiver (106) of the receiver module (101) are coupled to the (Continued)

couplers (102). The main receiver (106) may operate in a sleep mode and in an operational mode. The wake-up receiver (108) generates a wake-up signal (107) when signals received via the body transmission channel (160) in a predefined spectral range exceed an energy threshold level. The wake-up signal (107) is provided to a circuitry of the body coupled communication device (100) to directly or indirectly configuring the main receiver (106) in the operational mode.

15 Claims, 5 Drawing Sheets

(51) Int. Cl.
*H04W 4/00* (2018.01)
*H04W 52/02* (2009.01)
*G06F 1/32* (2006.01)

(52) U.S. Cl.
CPC ......... *H04W 52/0225* (2013.01); *G06F 1/325* (2013.01); *Y02D 70/00* (2018.01); *Y02D 70/166* (2018.01); *Y02D 70/26* (2018.01)

(56) References Cited

U.S. PATENT DOCUMENTS

| | | | |
|---|---|---|---|
| 7,443,290 B2 | 10/2008 | Takiguchi | |
| 8,019,316 B2 | 9/2011 | Huston | |
| 8,083,674 B2* | 12/2011 | Such | A61B 5/0002 128/920 |
| 8,224,244 B2 | 6/2012 | Kim | |
| 8,467,431 B2 | 6/2013 | Park | |
| 8,577,327 B2* | 11/2013 | Makdissi | A61N 1/37288 455/343.1 |
| 8,625,557 B2* | 1/2014 | Fukuda | G06F 1/163 370/311 |
| 2004/0044493 A1* | 3/2004 | Coulthard | G06Q 50/22 702/122 |
| 2008/0259043 A1* | 10/2008 | Buil | H04B 13/005 345/173 |
| 2009/0129303 A1* | 5/2009 | Tomita | H03K 5/08 370/311 |
| 2010/0234756 A1 | 9/2010 | Hyoung | |
| 2010/0315206 A1* | 12/2010 | Schenk | H04B 13/005 340/286.01 |
| 2011/0107075 A1 | 5/2011 | Kwak | |
| 2011/0299512 A1 | 12/2011 | Fukuda | |
| 2012/0013446 A1 | 1/2012 | Ino | |
| 2012/0033584 A1 | 2/2012 | Corroy | |
| 2012/0077433 A1* | 3/2012 | Walker | H04M 1/7253 455/41.1 |
| 2014/0316404 A1* | 10/2014 | Neumann | A61B 18/1233 606/34 |

FOREIGN PATENT DOCUMENTS

| | | |
|---|---|---|
| JP | 2005318655 A | 11/2005 |
| RU | 2145441 C1 | 2/2000 |
| WO | WO2008008987 A2 | 1/2008 |
| WO | WO2009044368 A2 | 4/2009 |
| WO | WO2010049842 A1 | 5/2010 |
| WO | WO2010075115 A2 | 7/2010 |
| WO | WO2010146490 A1 | 12/2010 |
| WO | WO2012010676 A1 | 1/2012 |
| WO | WO2014177412 A1 | 11/2014 |

OTHER PUBLICATIONS

Fazzi, A. et al., "2.75mW Wideband Correlation-Based Transceiver for Body-Coupled Communication", ISSCC / Session 11 / TD: Trends in Wireless Communications / 11.5.

* cited by examiner

RECEIVER, TRANSCEIVER, TRANSCEIVER MODULE FOR A BODY COUPLED COMMUNICATION DEVICE, A BODY COUPLED COMMUNICATION SYSTEM AND A METHOD OF WAKING-UP A BODY COUPLED RECEIVER OF A BODY COUPLED COMMUNICATION DEVICE

FIELD OF THE INVENTION

The invention relates to receiver modules, transmitter modules and transceiver modules for body coupled communication devices. The invention further relates to a body coupled communication device comprising a receiver module, a transmitter module and/or a transceiver module. The invention further relates to a method of waking-up a body coupled receiver of a body coupled communication device.

BACKGROUND OF THE INVENTION

Body coupled communication (BCC) allows exchange of information between devices that are located at or in close proximity of a body of, for example, a user. The BCC signals are transmitted via the body instead of via a wire or instead of via radio signals. The signal is transmitted via low-energy electrical fields that are capacitively or galvanically coupled onto the body surface. The low-energy electrical field is coupled to the body via couplers, which are, for example, electrodes. Sometime the term antenna is used in the field of BCC for identifying the couplers, however, in BCC no radio signals are transmitted via the couplers and only a low-energy electrical field is generated or received via the couplers. BCC is possible when the body of the user is in the direct vicinity of the couplers of the device and capacitive or galvanic coupling between the device and the body is the basis for the transmission of signals. In other embodiment, the body may be in direct contact with the couplers. BCC has some specific advantages, such as: the amount of energy used in body coupled communication is relatively low and the signals of the body coupled communication can only be received (and transmitted) by devices which are in the direct vicinity of the body which forms the transmission channel of the body coupled communication. Thereby the coverage area of the body coupled communication is confined.

In published patent application WO2010/049842A1 an exemplary communication apparatus for and a method of receiving a body coupled communication signal has been disclosed. Although the amount of energy used in body coupled communication is relatively low, the communication apparatus of the cited prior art may still use too much energy. Especially in the field of BCC relatively small devices, such as a wrist watch, a mobile phone, etc. may be used in the communication system and such devices have in general limited energy resources.

In published patent application US2011/0299512A1 a communication device including a first communication unit for performing communication by a communication scheme is provided. The communication scheme is for applying voltage from a signal electrode that is in contact with or that is brought into proximity of a human body and for generating an electric near field on a human body surface and performing transmission. A second communication unit is different from the first communication unit and comprises a switching signal detection unit for detecting, from signals intermittently received by the first communication unit, a mode switching signal for switching the second communication unit from a power save mode to a normal mode, and a switching control unit for switching the second communication unit from the power save mode to the normal mode in a case the mode switching signal is detected by the switching signal detection unit.

SUMMARY OF THE INVENTION

It is an object of the invention to provide modules of a body coupled communication device and/or system which use less power and to provide a body coupled communication devices which use less power.

An aspect of the invention provides a receiver module. Another aspect of the invention provides a transceiver module. A further aspect of the invention provides a body coupled communication device. In yet another aspect of the invention a method of waking-up a body coupled receiver of a body coupled communication device is provided. Advantageous embodiments are defined in the dependent claims.

A receiver module for a body coupled communication device in accordance with an aspect of the invention comprises couplers, a main receiver and a wake-up receiver.

The receiver module is for receiving signals via a body transmission channel. The couplers receive signals from the body transmission channel which follows a body of a user when the body is in the direct vicinity of the couplers. The main receiver is coupled to the couplers and receives data via signals transmitted via the body transmission channel. The main receiver may operate in a sleep mode and may operate in an operational mode. The wake-up receiver is also coupled to the couplers and provides a wake-up signal to a circuit of the body coupled communication device to directly or indirectly configure the main receiver in the operational mode. The wake-up receiver comprises a band-pass filter which allows the passage of signals in a pre-defined spectral range that is related to wake-up signals that are transmitted via the body transmission channel. The wake-up receiver generates the wake-up signal when an energy of signals received by the couplers in the predefined spectral range exceeds an energy threshold level.

According to the invention, the receiver module is subdivided in a wake-up receiver and a main receiver. The main receiver is, in general, a circuit which requires a relatively large amount of logic and processing power. Therefore, when the main receiver is capable of entering the sleep mode in which not much energy is used, the main receiver may save a lot of energy at moments in time when there is no communication along the body transmission channel. However, when there is communication along the body transmission channel, the main receiver must be woken up such that it operates in its normal operational mode. The wake-up signal received from the wake-up receiver directly or indirectly configures the main receiver in the operational mode. Thus, especially during periods without communication via the body transmission channel, the main receiver saves a lot of power because of the sleep mode. The wake-up receiver has a relatively simple task which comprises filtering the signals received at the couplers within the specific spectral range and determining whether the energy of the signals in the specific spectral range exceeds the energy threshold level. This may be implemented in an energy-efficient circuit and, thus, the wake-up receiver does not use a lot of power. The amount of energy used by the wake-up receiver is less than the amount of energy saved by the main receiver which sleeps in periods without communication via the body transmission channel. Thus, the receiver module that is discussed above is more energy efficient than the known receiver modules of body coupled communication devices.

The wake-up signal is provided to a circuit of the body coupled communication device. Such a circuit is, for example, a microprocessor, a microcontroller or a processing unit of the body coupled communication device and this circuit configures the main receiver in the operational mode. This is an example of indirectly configuring the main receiver in the operational mode because the wake-up signal is not directly provided to the main receiver. The wake-up signal is a sort of interrupt signal that is received by a circuit which handles all the interrupts generated in the body coupled communication device and this circuit is capable of controlling other elements of the body coupled communication device in the operational mode. In another example, the main receiver itself comprises a microprocessor, a microcontroller or a processing unit which receives the wake-up signal and this integrated microprocessor, integrated microcontroller or integrated processing unit controls the main receiver in the operational mode when the wake-up signal is received. In yet a further example, the circuit to which the wake-up signal is provided is the main receiver. The main receiver may comprises a wake-up input to which the wake-up signal is provided and the main receiver comprises some dedicated hardware which controls the main receiver in the operational mode when the wake-up signal is received at the wake-up input.

The wake-up receiver is, in particular, sensitive for signals in the predetermined spectral range. Thus, the predetermined spectral range is the range of the frequency spectrum in which signals are transmitted via the body transmission channel to wake-up a receiver. It actually means that another device which is in the direct vicinity of the same body as the receiver module must at least transmit energy in this predetermined spectral range to wake-up the receiver module. The invention is not limited to particular wake-up signals and the only limitation is that enough energy is transmitted in the predetermined spectral range such that the wake-up module receives more energy than the predetermined energy threshold level. In an embodiment, exceeding the threshold level may relate to exceeding an amplitude threshold because the amount of received energy often relates to the amplitude of the received signals and, thus, in this embodiment, it means that the wake-up receiver must compare the amplitude of the received signals with an amplitude threshold level. In general the amount of energy is related to a period of time and, thus, in another embodiment, the predefined threshold level may define that more than a specific amount of energy must be received in a predetermined period of time before the wake-up signal is generated.

The direct vicinity is defined as a maximum distance at which the main receiver is capable of receiving information via the body transmission channel. The maximum distance is a distance between the body of the user and the couplers. Optionally, the maximum distance is closer than 10 cm, or closer than 5 cm. Optionally, the maximum distance is closer than 2 cm. In an optional embodiment of the invention, direct vicinity means that the user touches the couplers. It is to be noted that, as discussed in the background of the art section, the couplers are for generating or receiving a low power electrical field and for creating a capacitive or galvanic coupling between the body of the user and the couplers. The couplers may be embodied in electrodes, metal plates, etc.

It is to be noted that the sleep mode is a mode in which the main receiver is not operational and does not use much energy. It might even be that the main receiver is completely switched off and that only a small monitoring circuit, which monitors the reception of the wake-up signal, is active during the sleep mode. Although not directly important in the context of the above discussed effects and advantages of the invention, the main receiver or the body coupled communication device may comprise means which control the main receiver into the sleep mode. Such means, for example, detect whether there was no communication activity via the body transmission channel for a predefined interval of time. If there was no communication during the predefined interval of time, the main receiver may be controlled into the sleep mode.

The wake-up receiver comprises an energy level detector which is configured to detect during an interval of time whether the total amount of received energy of the signals in the predefined spectral range exceeds the energy threshold level. Detecting during an interval of time has the advantage that a very short interference signal is not detected as a possible wake-up signal because very short interference signals do often not comprise enough energy to exceed the energy threshold level which is defined for an interval of time.

Optionally, the energy level detector comprises an integrator for integrating the received energy starting from a specific moment in time for the duration of the interval of time and the energy level detector comprises a comparison element for comparing the output of the integrator with the energy threshold level. The integrator receives, for example, on a regular basis a reset signal to reset the integrated value to 0. However, embodiments of the energy level detector are not limited to this discussed optional embodiment and the skilled person is capable to design other energy level detectors which are capable of detecting during an interval of time whether the total amount of received energy exceeds the energy threshold level.

Optionally, the predefined spectral range is arranged in a body coupled communication spectral range below a carrier frequency used for communicating data via the body transmission channel. The body transmission channel well transmits signals in the body coupled communication spectral range from 50 kHz up to 10 MHz, and is optimal for signal in the frequency range from 100 kHz up to 1 MHz. In order to have a high enough data throughput via the body transmission channel, the data which is communicated between a transmitter and the receiver module of a body communication device after the initialization of a connection between the transmitter and the receiver, is often transmitted at relatively high carrier frequency, for example frequencies of at least 1 MHz, and often at frequencies of around 10 MHz. Optionally different carrier frequencies are used. However, in order to have an energy efficient transmitter and/or to have an energy efficient wake-up receiver it is advantageous to use signals of relatively low frequencies to wake up the receiver module. Thus, the predefined spectral range is arranged below the carrier frequency or carrier frequencies which are used for the communication which follows the initialization of a connection between a transmitter and a receiver. For example, the predefined spectral range is from 50 kHz to 1 MHz. Or, in another example, the predefined spectral range is from 100 kHz to 1 MHz. Or, in a further example, the predefined spectral range is from 110 kHz to 500 kHz. It is also possible that the wake-up signals are transmitted at frequencies around, for example, 7 MHz. In that case the predefined spectral range is, for example, from 6.5 to 7.5 MHz.

Optionally, the wake-up receiver comprises a controller which generates the wake-up signal when the energy reception level detector detects that the threshold level is exceeded. The controller may further control a start of the interval of time and an end of the interval of time. In other words, the energy reception level detector is coupled to the controller and provides the controller with a signal when the total amount of energy exceeds the energy threshold level. The controller may decide to generate the wake-up signal on basis of the information received from the energy reception level detector. Furthermore, the controller provides to the energy reception level detector a signal which indicates when the interval of time starts and/or when the interval of time ends. Such a signal may be, for example, a reset signal for the optional integrator of the energy reception level detector. The controller may comprise a timer which generates at regular moments in time a signal which is provided to the energy reception level detector to reset the integrator. The controller and/or the timer may be configured to use an interval of time of a predetermined fixed length, but in specific embodiments the length of consecutive intervals of time may vary.

Optionally, the controller is configured to determine the energy threshold level and to provide the energy threshold level in the form of a control signal to the energy reception level detector Optionally, the controller is configured to generate the wake-up signal only when the energy reception level detector detects in two or more consecutive intervals of time that the total amount of received energy of the signals in the predefined spectral range exceeds the threshold level. Thus, when during a first interval of time the reception level detector detects that the threshold level has been exceeded, the controller does not immediately generate the wake-up signal, but the controller may start a new interval of time in which the reception level detector detects once more whether the threshold level is exceeded. The controller counts during how many consecutive intervals of time the threshold level is exceeded and generates, when a predefined minimum of consecutive interval number is exceeded, the wake-up signal. It is to be noted that the controller controls the start and the end of the (consecutive) intervals of time. In an embodiment, the consecutive intervals of time have the same length (for example, a predefined fixed length), or the consecutive intervals of time has variable lengths. The effect of this optional embodiment is that the generation of false wake-up signals is significantly because, when the total amount of energy of the received signals in the predefined spectral range is larger than the threshold value in consecutive intervals of time, the probability that another body coupled communication enabled device is in the close proximity of the body of the user is larger. Thus, a more reliable wake-up mechanism is obtained.

Optionally, the controller is configured to detect from the start of the interval of time within how many units of time the total amount of received energy of the signals in the predefined spectral range exceeds the threshold level. In other words, when the controller controls the start of the interval of time, a time measurement is started to detect within how many units of time the energy reception level detector detects that the threshold level is exceeded. This may be done by a counter which counts the units of time starting from a moment in time that it received a reset signal. The controller may be configured to reset the counted at the start of the interval of time and the controller may be configured to read the counted units of time from the counter when it receives from the reception level detector a signal indicating that the total amount of energy of the signals in the predefined spectral range exceed the threshold level. It may be advantageous to know within how many units of time the threshold level has been reached because it relates to the received signal strength.

Optionally, the controller is configured to generate a received signal strength indication signal on basis of the number of units of time in between the start of the interval of time and the moment of time at which the total amount of received energy of the signals in the predefined spectral range exceeds the threshold level. The generation of the received signal strength indication signal may also take into account the energy threshold level. In many applications it is useful to know an RSSI (Received Signal Strength Indication) value because it tells something about the quality of the received signals and/or the proximity of the transmitter of the signals. If the signal strength is relatively high, the transmitter may be in the direct neighborhood and/or may be a powerful transmitter and the received signals have probably a relatively high quality. This information may be used by the main receiver such that it can faster and better synchronize with the transmitter of the signals and this information may be used by a main transmitter such that it transmits signals back at an appropriate signal strength level. Furthermore, the signal strength indication signal may be used for logging and/or debugging.

Optionally, the controller is configured to estimate the amount of noise or the amount of interference signals in the predefined spectral range during a period of time in which no wake-up signals or data signals are transmitted via the body transmission channel by detecting from a start of a sub-interval of the period of time within how many units of time the total amount of received energy of the signals in the predefined spectral range exceeds a further threshold level. The length of the sub-interval of the another interval of time is longer than the length of the interval of time (which is used to detect whether a wake-up signal must be generated) and/or the further threshold level is lower than the threshold level (which is used to detect whether a wake-up signal must be generated).

In this optional embodiment, the controller has knowledge about the fact that no other data signals and/or wake-up signals are being received via the body coupled network. For example, in between two consecutive data packets transmitted in a sequence there may always be a period of time during which no signals are transmitted. During this period measurements may be performed to detect the noise level of the output of the couplers or the level of the interference signals received by the body transmission channel and received by the couplers. In normal operation, the length of the intervals of time (in which it is detected that the total amount of energy received in the predefined spectral range exceeds the threshold level) and the threshold level are chosen such that under normal circumstances noise and interference signals do not result in exceeding the threshold level. Thus, in order to detect within how many units of time the noise or the interference signals result in exceeding the further threshold level, the further threshold level must be lower than the threshold level, or the length of the sub-interval of time must be longer than the interval of time. If the controller comprises a counter, the counter may be used to count the units of time from the start of the sub-interval. The information on the amount of noise and/or interference signals may be used by, for example, the main receiver for more reliable receiving data signals. If this information is combined with the RSSI value, a signal to noise ratio may be determined.

Optionally, the main receiver is configured to analyze signals received from the couplers to detect a communication type identification value which indicates a specific communication type of a forthcoming communication via the body transmission channel. The main receiver is further configured to provide an additional wake-up signal for configuration other circuitries of the body coupled communication device in an operational mode when the specific communication type identification value is detected. According to this optional embodiment, additional means are provided to wake up other circuitries of the body coupled communication device. In particular, according to this optional embodiment, other circuitries receive the additional wake-up signal later in time than the receiver module receives the wake-up signal, and the other circuitries do only receive the additional wake-up signal when the communication type identification value has been detected. Thus, if another device is transmitting information via the body transmission channel, it has to transmit such a communication type identification value before the communication can be continued with the receiver module of this optional embodiment. The communication type identification value may also be used by the other circuitries to initiate specific actions, like initializing specific processes needed for the forthcoming communication type, or preparing a specific reply which is according to the format of the forthcoming communication type. This optional embodiment allows more energy saving by the receiver module because the other circuitries may be in a sleep mode for a longer time before they are woken up into the operational mode. It also prevents that communication is started with devices which are not able to identify the type of forthcoming communication.

Optionally, signals received at the couplers comprising the communication type identification value have the function of a broadcast message to indicate to other body coupled communication devices in the direct vicinity of the body of the user what kind of services can be offered by the device which transmits the signals comprising the communication type identification value.

Optionally, the communication type identification value indicates one of: a protocol to be used in the forthcoming communication, a service provided by the device which transmitted the wake-up signals or a service that is going to be used by the device which transmitted the wake-up signals, a security level of the forth coming communication. This additional information may help to select whether the other circuitries must be woken up and how the other circuitries should operate in the operational mode.

Optionally, the main receiver comprises a data storage for storing a list of communication type identification values of communication types supported and/or provided by the body coupled communication device which comprises the receiver module. The main receiver is configured to generate the additional wake-up signal only when the communication type identification value is present on the list of communication type identification values. Thus, according to this optional embodiment, the other circuitries of the body coupled communication device are only woken up when they are able to communicate with the transmitter of the communication type identification values. This prevents false wake-ups and, thus, saves energy in the body coupled communication device which comprises the receiver module.

According to another aspect of the invention, a transceiver module for a body coupled communication device has been provided. The transceiver module is for receiving and transmitting signals via a body transmission channel. The transceiver module comprises a receiver module according to one of the embodiments of the previously discussed aspect of the invention and comprises a main transmitter which is coupled to the couplers. The couplers are also for transmitting signals via the body transmission channel. The main transmitter is configured to transmit data via signals transmitted via the body transmission channel. The main transmitter is configured to operate in a sleep mode and to operate in an operational mode. It is to be noted that the main transmitter and the main receiver are not necessarily separate pieces of hardware—they may, for example, be integrated into a single main transceiver—for clarity the above components/units/modules are separately discussed.

It is to be noted that the sleep mode is a mode in which the main transmitter is not operational and does not use much energy. It might even be that the main transmitter is completely switched off and that only a small monitoring circuit, which monitors the reception of the wake-up signal, is active during the sleep mode. Although not directly important in the context of the effects and advantages of the invention, the main transmitter may comprise means which control the main transmitter into the sleep mode. Such means, for example, detect whether that there was no communication activity via the body transmission channel for a predefined interval of time. If there was no communication during the predefined interval of time, the main transmitter may be controlled into the sleep mode.

Optionally, when the main receiver generates a wake-up signal and does not generate the additional wake-up signal, the main transmitter receives the wake-up signal and the main transmitter is configured to operate in the operational mode when the wake-up signal is received. When the main receiver also generates the additional wake-up signal, the main receiver receives the additional wake-up signal and the main receiver is configured to operate in the operational mode when the additional wake-up signal is received.

This optional embodiment saves energy because the main transmitter may be in the sleep mode for a relatively large period of time and when one of the wake-up signals indicates that the main transmitter must be arranged in the operational mode, the main transmitter starts to use energy.

Optionally, the main transmitter is configured to transmit an acknowledgement signal via the body transmission channel shortly after being configured in the operational mode. The acknowledgement signal indicates that the transceiver module is ready for subsequent communication and/or the acknowledgement signal indicates that the transceiver module is capable of handling the specific communication type being identified by the received communication type identification value. Thus, the device, which transmitted the wake-up signal with the communication type identification value, learns from the acknowledgement signal that another device is coupled to the body transmission channel and that subsequently communication of the identified communication type may start.

Optionally, the acknowledgement signal comprises information for setting up a secure communication link between the transceiver module and the device that transmitted the wake-up signal with the communication type identification value.

According to a further aspect of the invention, a body coupled communication device is provided which comprises a transceiver module according to the previously discussed aspect of the invention and comprises a processing unit. The processing unit is configured to process data received by and data to be transmitted via the transceiver module. The processing unit is also configured to operate in a sleep mode and in an operational mode. When the main receiver generates a wake-up signal and not the additional wake-up signal, the processing unit receives the wake-up signal and the processing unit is configured to operate in the operational mode when the wake-up signal is received. When the main receiver also generates the additional wake-up signal, the processing unit receives the additional wake-up signal and the processing unit is configured to operate in the operational mode when the additional wake-up signal is received.

The body coupled communication device is very energy efficient, because not only modules of the transceiver module may be in the sleep mode when there is no communication activity via the body transmission channel, but also the processing unit of such a device may be arranged in the sleep mode to save energy. When, subsequently, signals are received via the body transmission channel, and these signals fulfill certain conditions (e.g. enough energy in predefined spectral range and/or the signals comprise a communication type identification value that has been recognized), the processing unit starts to use more energy in the operational mode.

According to yet another aspect of the invention, a method of waking-up a body coupled receiver of a body coupled communication device is provided. The body coupled receiver is configured to operate in a sleep mode and to operate in an operational mode and the body coupled receiver is configured to receive data via signals transmitted via a body transmission channel which follows a body of a user. The method comprises the stage of: i) receiving signals from the body transmission channel, the signals are received at couplers of the body coupled communication device, the couplers are configured to receive signals via the body transmission channel when the user is in the direct vicinity of the couplers, ii) filtering the received signals to obtain a filtered signal which comprises the spectral components of the received signals in a predefined spectral range which relates to wake-up signals that are transmitted via the body coupled transmission channel, iii) detecting on basis of the filtered signal whether an energy of the received signals in the predefined spectral range exceed an energy threshold level, and iv) providing a wake-up signal to the body coupled receiver for configuring the body coupled receiver in the operational mode.

Optionally, the body coupled communication device comprises at least a further circuitry which is configured to operate in a sleep mode and to operate in an operational mode and the method of waking-up a body coupled receiver of a body coupled communication device further comprises the stage: v) detecting a communication type identification value in the filtered signal, the communication type identification value indicating a specific communication type of a forthcoming communication via the body transmission channel, and vi) providing a further wake-up signal to the further circuitry to configure the further circuitry in the operational mode. It is to be noted that the further circuitry may be a processing unit of the body coupled communication device or may be a body coupled transmitter of the body coupled communication device.

The above discussed method provides the same benefits as the receiver module, the transceiver module, the body coupled communication device and the transmitter module and has similar embodiments with similar effects as the corresponding embodiments of the modules and devices.

Optionally, a computer program is provided which comprises instructions for causing a processor system to perform the stage of the method of the fifth aspect of the invention.

Optionally, a computer program as described above is provided and which is embodied on a computer readable medium These and other aspects of the invention are apparent from and will be elucidated with reference to the embodiments described hereinafter.

It will be appreciated by those skilled in the art that two or more of the above-mentioned options, implementations, and/or aspects of the invention may be combined in any way deemed useful.

Modifications and variations of the system, the method, and/or of the computer program product, which correspond to the described modifications and variations of the system, can be carried out by a person skilled in the art on the basis of the present description.

Figure 1:
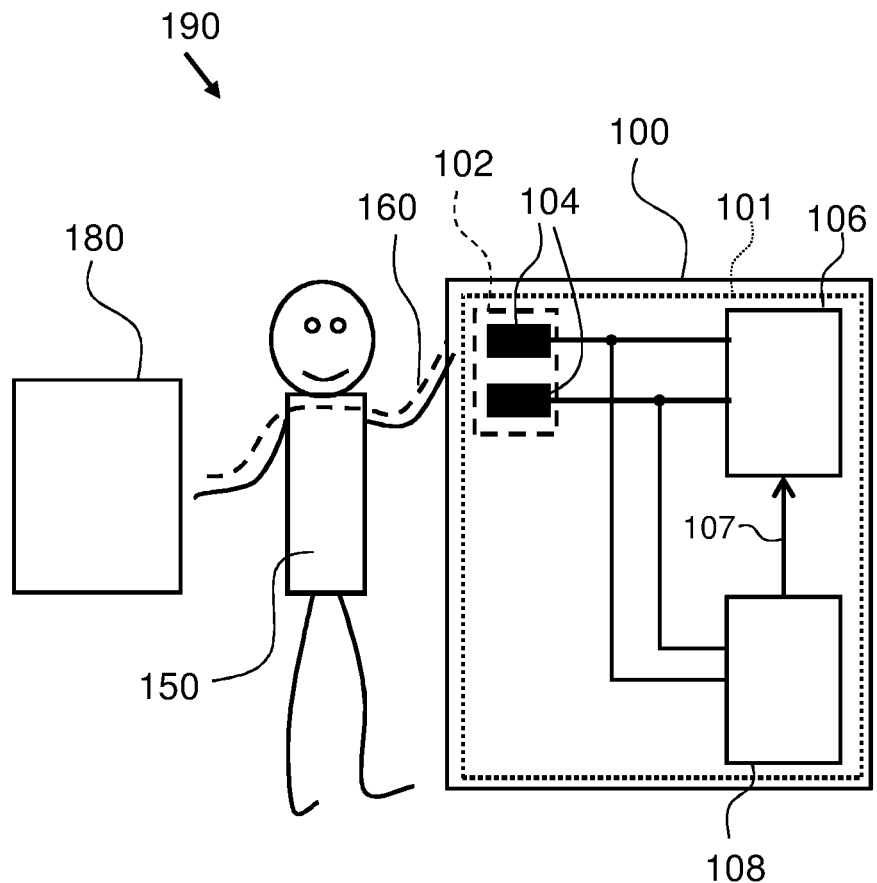
FIG. 1 schematically shows an embodiment of a body coupled communication system comprising devices and modules according to the invention, FIG. 2 schematically shows an embodiment of a wake-up receiver of a body coupled communication device according to the first aspect of the invention, FIG. 3 schematically shows another embodiment of a body coupled communication system, FIG. 4*a* schematically shows a signal transmitted by a transmitter module and intervals of time related to the operation of a receiver module, FIG. 4*b* schematically shows a transmission of signals between different components of a body coupled communication system, and FIG. 5 schematically shows an embodiment of a method of waking-up a body coupled receiver of a body coupled communication device.

It should be noted that items denoted by the same reference numerals in different Figures have the same structural features and the same functions, or are the same signals. Where the function and/or structure of such an item have been explained, there is no necessity for repeated explanation thereof in the detailed description.

The Figures are purely diagrammatic and not drawn to scale. Particularly for clarity, some dimensions are exaggerated strongly.

DETAILED DESCRIPTION

A first embodiment is shown in FIG. 1. FIG. 1 schematically shows an embodiment of a body coupled communication system 190 comprising a first body coupled communication device 100 and a second body coupled communication device 180. As well as the first body coupled communication device 100 and the second body coupled communication device 180 are configured to communicate signals and data via a body transmission channel 160 which is formed by the body of a user 150. The first body coupled communication device 100 and the second body coupled communication device 180 are able to communicate via the body transmission channel when couplers of the respective devices is in the direct vicinity of the body of the user. Direct vicinity of the body of the user means that the couplers and the body are within a maximum distance of each other to allow the exchange of signals via the body of the user. Optionally, the maximum distance (of the direct vicinity) is closer than 10 cm, or closer than 5 cm. Optionally, the maximum distance is closer than 2 cm. In an optional embodiment of the invention, direct vicinity means that the user touches the respective couplers of the first body coupled communication device 100 and a second body coupled communication device 180. It is to be noted that the communication is only possible when both devices are simultaneously in the direct vicinity of the body of the user.

The first body coupled communication device 100 comprises a receiver module 101 which is capable of receiving signals, data and information via the body transmission channel 160. The receiver module 101 comprises couplers 102 for receiving signals from the body transmission channel when the body is in the direct vicinity of the couplers 102. In an embodiment, the couplers 102 comprise two metal plates 104 which form two poles of the couplers 102. The receiver module 101 further comprises a main receiver 106 which is coupled to the couplers 102 and further comprises a wake-up receiver 108 which is also coupled to the couplers 102.

The main receiver 106 is configured to operate in an operational mode and to operate in a sleep mode. In the sleep mode most circuitries of the main receiver 106 are switched off and do not use power. In the sleep mode the main receiver 106 is only able to detect whether it receives a wake-up signal 107 and when it receives the wake-up signal 107, the main receiver 106 is configured into the operational mode in which the main receiver 106 is fully operational to receive signals, and, thus, data and information via the body transmission channel 160. In an optional embodiment, the main receiver 106 comprises means to detect lack of communication activities via the body transmission channel. For example, such means generates a sleep signal when during a predetermined period of time no signals are transmitted via the body transmission channel 160 and the main receiver 106 is configured into the sleep mode when the sleep signal is generated. The main receiver 106 may further be configured to synchronize to signals received via the body transmission channel 160 and to demodulate the received signals. The demodulated signals may be provided to other circuitries (not shown) of the first body coupled communication device 100, such as, for example, a processing unit.

The wake-up receiver 108 receives the signals that are intercepted by the couplers 102. The signals of the couplers 102 are filtered by a band-pass filter (not shown) to obtain a filtered signal. The band-pass filter only allows the passage of signals in a particular predefined spectral range and attenuates signals outside this predefined spectral range. The predefined spectral range is related to frequencies of wake-up signals that are transmitted via the body transmission channel. The wake-up receiver 108 comprises means to detect whether the energy of the filtered signal exceeds an energy threshold level. When the energy threshold level is exceeded, the wake-up receiver 108 generates the wake-up signal 107 which is provided to the main receiver 106. As discussed previously, when the wake-up signal 107 is received by the main receiver 106, the main receiver 106 is configured into its operational mode. Thus, in periods of time that the main receiver 106 is in its sleep mode and no wake-up signal 107 is generated by the wake-up receiver 106, power is saved.

The second body coupled communication device 180 also comprises a couplers (not shown) and comprises a transmitter (not shown) which is configured to transmit signal via the couplers and, thus, via the body transmission channel. When the second body coupled communication device 180 wants to initiate communication via the body transmission channel, the second body coupled communication device 180 transmits wake-up signals via the body transmission channel 160. Wake-up signals are, for example, sinusoidal waves at a wake-up frequency and these sinusoidal waves may be transmitted during wake-up periods of time. For example, during 100 milliseconds a signal at 100 kHz may be transmitted. For example, during consecutive periods of time, every first 0.5 second a signal is transmitted at 150 kHz. For example, micro-preambles may be transmitted, such as described in US patent application publication US2012/0033584.

In an optional embodiment, the predefined spectral range, which is the spectral range within which wake-up signals are transmitted/received, is below the frequency or frequencies at which the normal data communication is performed via the body transmission channel. For example, the normal data communication from the second body coupled communication device 180 to the first body coupled communication device 100 is performed at, for example, a single carrier frequency of 10 MHz, or, for example, at a plurality of carrier frequencies in the range from 1 MHz to 50 MHz. The wake-up signals are transmitted at, for example, 100 kHz, and thus, the predefined spectral range may be from 90 kHz to 110 kHz.

In an embodiment, the wake-up receiver 108 may analyze the amplitude of the received wake-up signals to detect whether their energy exceeds the energy threshold level. However, this may result in false wake-up detections when noise or interference of a relatively high amplitude level is received. Thus, in another embodiment, the wake-up receiver determines during an interval of time whether the total amount of received energy received in the predefined spectral range exceeds the energy threshold level. Thus, the filtered signal is analyzed to determine the total amount of energy received during the interval of time and the total amount of received energy is compared to the energy threshold level and, if the total amount of received energy is larger than the energy threshold level, the wake-up signal 107 is generated and provided to the main receiver 106.

An exemplary embodiment of the main receiver 106 may be found in document WO2010/049842, however, the main receiver of that document must be further adapted to operate in the operational mode or in the sleep mode. This may be done by the skilled person by providing an on/off circuit to the main receiver of that document which cuts off power to the modules of the main receiver when the main receiver must operate in the sleep mode and which provides power to the modules of the main receiver when the main receiver has to operate in the operational mode.

Figure 2:
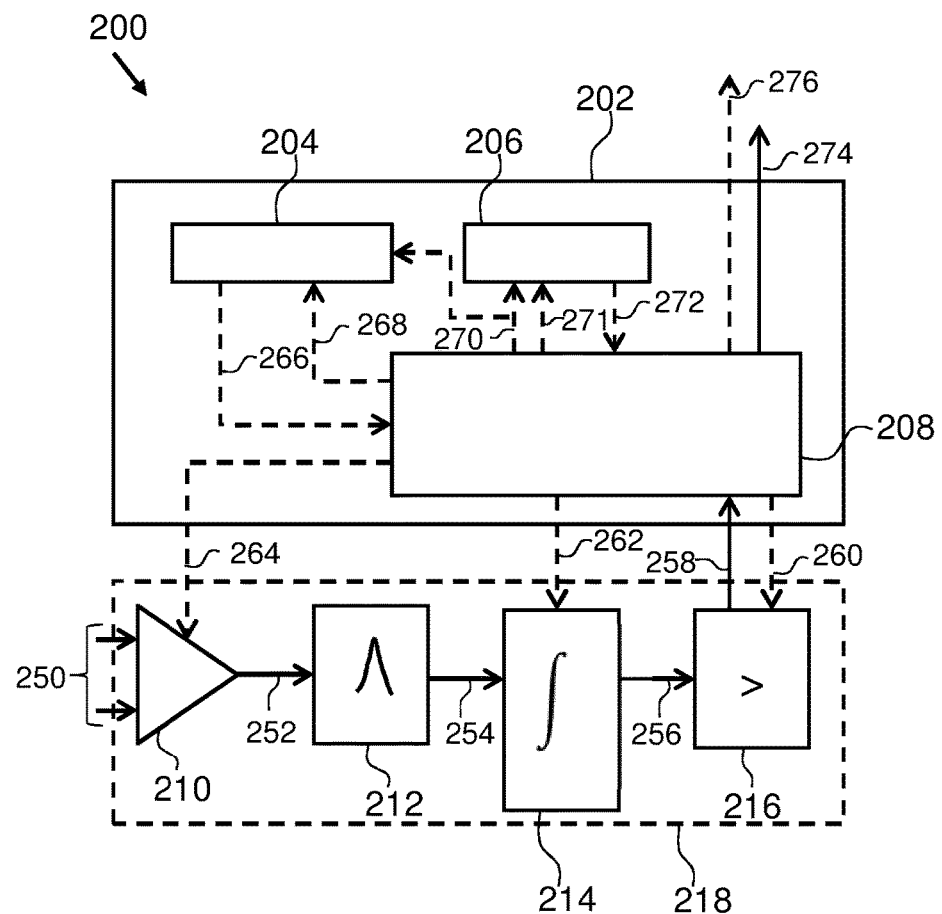

FIG. 2 schematically shows an embodiment of a wake-up receiver 200 of a body coupled communication device according to the first aspect of the invention. The wake-up receiver 200 may, for example, be used in the first body coupled communication device 100 of FIG. 1. The wake-up receiver 200 comprises a circuitry 218 to detect whether the energy of signals in the predetermined spectral range exceeds the energy threshold level and the wake-up receiver 200 comprises a controller 202.

The circuitry 218 receives signals 250 form the couplers, such as, for example, the couplers 102 of the receiver module 101 of FIG. 1. The signals 250 are provided to an amplifier 210, which is, for example, a differential amplifier, to generate an amplified signal 252. The amplified signal 252 is provided to a band-pass filter 212 which allows the passage of signals in the predefined spectral range (which is the spectral range which relates to wake-up signals) and attenuates signals outside the predefined spectral range. The band-pass filter 212 generates a filtered signal 254. The filtered signal 254 is provided to an integrator 214 which integrates the amount of energy of the signals of the filtered signal 254 during an interval of time. The integrator 214 generates a total energy amount signal 256 which is provided to a detector 216. The detector 216 compares the total energy amount signal 256 with an energy threshold level and generates, when the value indicated by the total energy amount signal is larger than the energy threshold level, a threshold signal 258 which is provided to the controller. It is to be noted that the output of the integrator 214 may be a continuous total energy amount signal 256 which gradually increases during the interval of time and, thus, as soon as the total amount of received energy exceeds the energy threshold value, the detector 216 generates the threshold signal. However, the invention is not limited to this implementation and, in another embodiment, the integrator 214 provided at the end of the interval of time the total energy amount signal 256 to the detector 216 and, then, only at the end of the interval of time the detector 216 is capable of generating the threshold signal 258 when the total amount of received energy in the predefined spectral range exceeded somewhere during the interval of time the energy threshold level. In the following of this document, the first type of output of the integrator 214 (as discussed above) is assumed.

It is also to be noted that the presented circuit 218 may be implemented as an analogue circuit, a digital circuit or a combination of both. Appropriate analogue to digital conversions may be added between the presented function blocks if a transition from an analogue to digital signal needs to be performed. It is further to be noted that the presented circuit is exemplary and that the skilled person is capable to find and define other solutions to detect whether the energy of signals in the predefined spectral range exceeds the energy threshold level.

In an embodiment, when the controller 202 receives the threshold signal 258, the controller 202 generates the wake-up signal 274 which is used to configure the main receiver in the operational mode. Alternative embodiments of the operation of the controller are discussed hereinafter.

The controller 202 may be configured to provide to the detector 216 with a setting signal 260 the energy threshold level. In particular embodiments it may be advantageous to be able to control the energy threshold level. For example, when it is known that the amount of noise is relatively large and that false wake-up signals are generated which resulted in the unnecessary waking up of the main receiver, the controller may decide to increase the energy threshold level and instruct the detector 216 accordingly. The controller 202 may further be configured to provide to the integrator 214 a reset signal 262 which resets the integrated value of the integrator 214 to zero. This actually means that the reset signal 262 determines when the interval of time starts during which the integrator determines the total amount of energy of the signals in the predefined spectral range. Optionally, the controller 202 provides to the integrator 214 an end of time interval signal (not shown) which determines when the interval of time has been ended. In practical embodiments, the reset signal 262 indicates when a new interval of time starts thereby indirectly indicating that the previous interval of time ended. In another optional embodiment, the controller 202 may be configured to provide an amplification factor signal 264 to the amplifier 210 to determine the amplification factor of the amplifier 210. In particular situations it may be advantageous to increase or decrease the amplification factor such that the wake-up receiver becomes less or more sensitive. As discussed previously, in situations with too many false generations of wake-up signals, the sensitivity of the wake-up receiver may be decreased by decreasing the amplification factor.

In an embodiment of the controller, the controller 202 comprises decision logic 208. The decision logic 208 receives the threshold signal 258 and decides whether the wake-up signal 274 must be generated. The decision logic 208 may be implemented as dedicated hardware which performs the task(s) of the decision logic 208 such that the dedicated hardware may be optimized with respect to energy user. Alternatively, the decision logic 208 may be implemented by means of a (general purpose) processor which executes a computer program comprising instructions for causing the processor to perform the task of the decision logic 208. The decision logic 208 may have many tasks. It is to be noted that the controller 202 may also be implemented in dedicated hardware, or, alternatively, the controller 202 as a whole may use a general purpose processor and that besides the function of the decision logic 208, the general purpose processor may also perform task of the timer and counter that are discussed hereinafter.

A first task to be executed by the decision logic 208 is to decide to generate the wake-up signal 274. As discussed previously, the decision logic 208 may decide to generate the wake-up signal 274 as soon as the threshold signal 258 has been received. However, in an alternative embodiment, the decision logic 208 may be configured to generate the wake-up signal 274 only when in two or more subsequent intervals of time the threshold signal 258 is received. Thus, during a relatively long period of time the signals in the predefined spectral range exceed the energy threshold level, and, thus, the probability that another device transmits wake-up signals via the body transmission channel increases. The decision logic 208 may comprises, for example, a counter which counts in how many consecutive intervals of time the threshold signal 258 is received and if the counted value exceeds a specific value, the wake-up signal 274 is generated.

In the above described optional embodiments, the decision logic 208 needs to receive timer information. The timer information is also useable for other tasks to be performed by the decision logic 208. In an optional embodiment, the controller 202 comprises a timer 206 which is configured to receive a reset signal 270 and to start an interval of time when the reset signal 270 is received. The timer 206 is also configured to receive an interval length signal 271 which indicates the required length of the interval of time, and which is configured to provide a time-out signal 272 when from the reception of the reset signal 270 a period of time has been lapsed which has a length that was set by the interval length signal 271. It is to be noted that the timer 206 may also be configured to operate with the reception of the interval length signal 271 and that in such an embodiment the timer 206 may generate the time-out signal 272 after a period of time of a predefined length. The timer 206 may have an internal clock which is used by the timer 206 to determine whether the period of time of the predefined length or of the length indicated by the interval length signal 271 has been lapsed.

A second task of the decision logical 208 may be to generate the reset signal 262 which indicates to the integrator 214 that a new interval of time starts. This reset signal 262 may be generated at the same moment of time as the reset signal 270 of the timer 206 is generated. When the timer provides the time-out signal 272, the reset signal 262 for the integrator 214 and the reset signal 270 for the timer

206 are subsequently generated when no threshold signal 258 had been received during the interval of time.

An optional third task of the decision logic 208 is to generate the setting signal 260 which indicates to the detector 216 the energy threshold level. The decision logical 208 may receive additional input (not shown) for adapting the energy threshold level. The energy threshold level may also be pre-programmed in the decision logic 208.

An optional fourth task of the decision logic 208 is to generate the amplification factor signal 264 which indicates to the amplifier 210 with which factor the signals 250 received from the couplers must be amplified. The decision logical 208 may receive additional input (not shown) for adapting the amplification factor of the amplifier 210. The amplification factor may also be pre-programmed in the decision logic 208.

A further optional task of the decision logic 208 is to generate an RSSI (Received Signal Strength Indication) signal 276 which indicates a strength of the received signals within the predefined spectral range. In particular when the integrator 214 continuously provides the total energy amount signal 256 (providing the integrated value) to the detector 216 and when the detector 216 immediately provides the threshold signal 258 to the decision logic when the energy threshold level is exceeded by the total energy amount signal 256, the decision logic may detect within how many units of time from the start of the interval of time (which was indicated by the reset signal 262) the threshold signal 258 was generated. The faster the threshold signal 258 was generated after the reset signal 262 was provided to the integrator 214, the stronger the received signal strength in the predefined spectral range is. The controller 202 may comprise a counter 204 to count the above discussed units of time. The counter may be configured to receive the reset signal 270 which resets the counted value of the counter 204, for example, to zero. The counter 204 may comprise an internal clock (or shares a clock with the timer 206) which determines the length of the units of time which are counted by the counter 204. The counter 204 may further comprise a further input for receiving a latch signal 268 and when the counter 204 receives the latch signal 268, a counted signal 266 is provided to the decision logic 208 which indicates the value of the counter 204 at the moment of time when the latch signal 268 was received. The decision logic 208 provides at the beginning of the interval of time the reset signal 270 (which is at the same moment of time that the integrator receives the reset signal 262). Subsequently, when the decision logic 208 receives the threshold signal 258, the decision logical 208 provides the latch signal 268 to the counter which subsequently provides the counted number of units of time. Subsequently, the decision logic 208 is capable to generate the RSSI signal 276. When the decision logic 208 also sets the energy threshold level via the setting signal 260 and/or the decision logic 208 also sets the amplification factor of the amplifier 210 via the amplification factor signal 264, the decision logic 208 has to take into account these settings to determine the value of the RSSI signal 276.

In an optional embodiment, the decision logic 208 has knowledge about a period of time during which no data, information or wake-up signals are being transmitted along the body transmission channel. These transmission-less periods of time may be used to detect a noise and/or interference level of the body transmission channel, and more in particular, in the predefined spectral range. In normal operation, the amplification factor of the amplifier 210, the length of the interval of time (which is used to detect whether the total amount of received energy in the predefined spectral range is larger than the threshold energy level), and the energy threshold level used by the detector 216 have such a value that no wake-up signal 274 is generated on basis of the amount of energy of only noise and interference signals in the predefined spectral range, while these parameters are in normal/wake-up operation set such that wake-up signals 274 are generated when (relatively weak) wake-up signals are received via the body transmission channel. In order to detect the noise level, the decision logic 208 may be configured to increase the amplification factor, to enlarge the interval of time or the lower the energy threshold level in the period of time that no data or information is being transmitted along the body transmission channel. When the value of one or more of these parameters is changed and the detector 216 detects that the total amount of energy received exceeds the energy threshold level, the units of time from the start of the (possibly extended) interval of time to the moment of time that the threshold signal 258 is generated together with the values of the parameters are an indication of level of noise and interference signals in the predefined spectral range. If the decision logic 208 has changed one of the above discussed values to detect the noise and interference level and the threshold signal 258 was not generated during the (possibly extended) interval of time, the values of the parameters may be changed even more for a subsequent interval of time to detect the level of the noise and interference signals. It is to be noted that, when the above discussed period of time (in which not data or information is transmitted along the body transmission channel) ends, the decision logic 208 must configured the amplification factor, the length of the interval of time and the energy threshold level back to their normal values to detect wake-up signals. It is further to be noted that the decision logical may calculate on basis of the detected noise and interference level and the generated RSSI (Received Signal Strength Indication) signal 276 an Signal to Noise ratio value which may be provided in a SN (Signal to Noise) ratio signal (now shown) to other circuitries of the body coupled communication device or to the receiver module which comprises the wake-up receiver 200.

Figure 3:
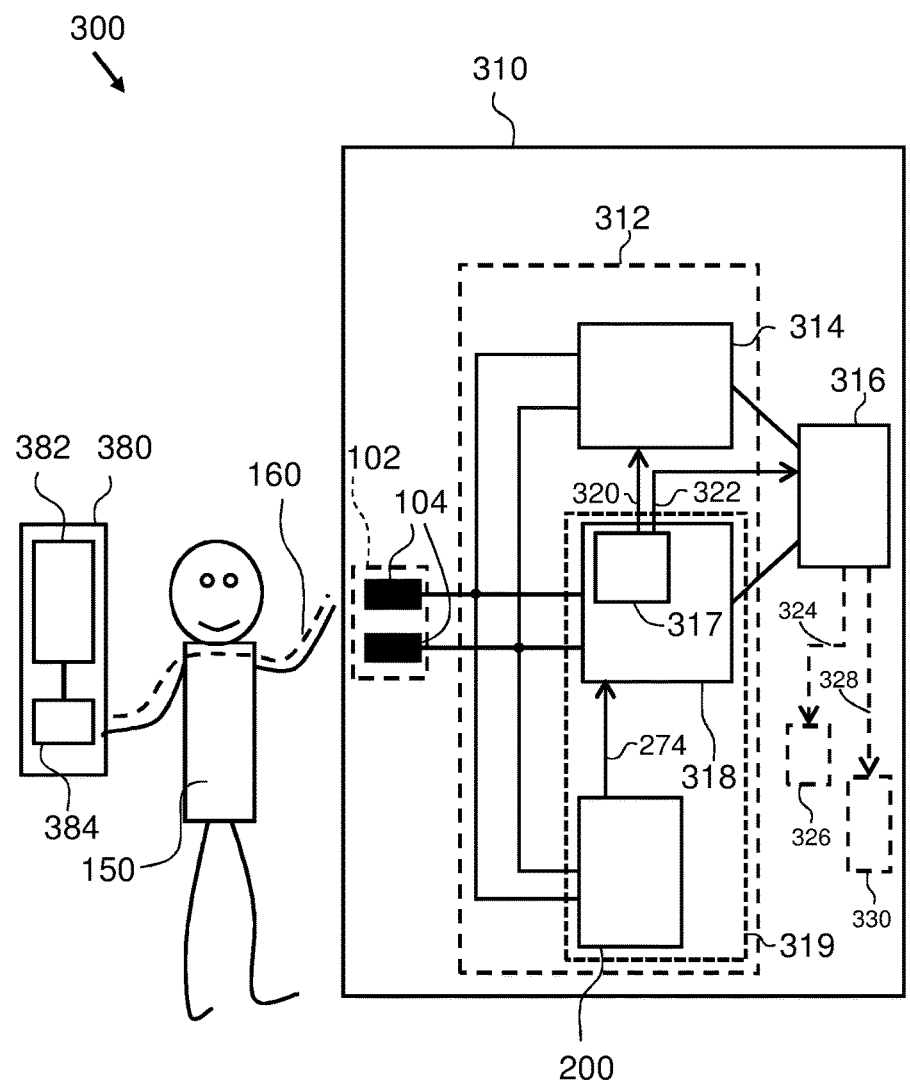

FIG. 3 schematically shows another embodiment of a body coupled communication system 300. The body coupled communication system 300 comprises a first body coupled communication device 310 and a second body coupled communication device 380. To discuss the operation of the body coupled communication system 300 the second body coupled device 380 is discussed first.

The second body coupled communication device 380 comprises couplers 384 and a transmitter module 382. When the body of the user 150 is in the direct vicinity of the couplers 384, the second body coupled communication device 380 is able to transmit data and information via the body transmission channel 160. The couplers may be embodied by two metal plates in a similar way as the couplers 102 of the first body coupled communication device 100 of FIG. 1. The transmitter module 382 is coupled to the couplers 384 and is configured to transmit via the couplers 384 and via the body transmission channel 160 signals to other devices (for example, to the first body coupled communication device 310). In particular, the transmitter module 382 is configured to generate, when initiating communication with another device, wake-up signals which must be transmitted via the body transmission channel 160 to wake-up a receiver module of another device. In the example of FIG. 3 the wake-up signals are transmitted to the second body coupled communication device 310 (when both devices are simultaneously in the direct vicinity of the body of the user 150) to wake-up, at least, a main receiver 318 of the first body coupled communication device 310. The transmitter module 382 is configured to transmit the wake-up signals in a predefined spectral range. The predefined spectral range is selected for transmitting the wake-up signals.

In a specific embodiment of the transmitter module 382, the transmitter module 382 is configured to transmit a communication type identification value in the wake-up signals. The communication type identification value indicates/identifies a specific communication type of the forthcoming communication. Thus, the transmitter module 382 has knowledge about the type of communication which will follow when, after being woken up, communication with another device is initiated. This knowledge may be based on information provided to the transmitter module 382 by other circuitries of the second body coupled communication device 380. The transmitter module 382 knows various communication type identification values and selects the appropriate value for the forthcoming communication. For example, the transmitter module 382 modulates a part of the wake-up signals in accordance with the communication type identification value. An example of a wake-up signal/packet will be discussed in the context of FIG. 4a. It is to be noted that the communication type identification value may be modulated according to different modulations schemes into the wake-up signals. The invention is not limited to a particular modulation scheme. In an embodiment, the wake-up signals start with a first signal-portion which comprises enough energy to wake-up a (main) receiver of other body coupled communication device (such as the first body coupled communication device 310) which are simultaneously in the direct vicinity of the body of the user 150. After the first signal-portion of the wake-up signals a second signal-portion follows in which the communication type identification value has been modulated.

The communication type identification value indicates/identifies a specific communication type of the forthcoming communication. Examples of communication types are specific protocols which are going to be used in the forthcoming communication, or a service that is going to be provided by the second body coupled communication device 380, or a service that is requested by the second body coupled communication devices 380 from one or more other devices which are in the direct vicinity of the body of the user 150. Another example is that the communication type identification value indicates a security level of the forthcoming communication. The wake-up signals with the communication type identification value may also have the function of broadcasting which type of services may be provided to other devices which are capable of receiving information via the body transmission channel 160.

It is to be noted that the second body coupled communication device 380 may also comprise other circuitries such as a receiver module, a processing circuitry, etc. In the context of the invention it is important that the second body coupled communication device 380 comprises the transmitter module which has characteristics as discussed above. The first body coupled communication device 310 comprises couplers 102, a transceiver module 312 and a processing unit 316. The couplers 102 are similar to previously discussed couplers (see, for example, FIG. 1). The transceiver module 312 is configured to receive and transmit data and information via the couplers 102 and, thus, via the body transmission channel 160 from and to other devices which are simultaneously in the direct vicinity of the body of the user 150. The processing unit is capable of processing data received by or data to be transmitted via the transceiver module. The processing unit 316 runs, for example, programming code of applications which, for example, interacts with the user via a display, via an input means, and/or via sound. Alternatively, or in addition, the processing unit 316 runs services or clients of services which are provided via the body transmission channel 160. The processing unit 316 is coupled to the transceiver module 312 to receive received data from the transceiver module 312 or to provide data for transmission to the transceiver module 312. The processing unit 316 may operate in different modes of which one mode is at least an operational mode in which it is able to transmit and receive data and information via the transceiver module 312 and of which one mode is at least an energy saving mode in which the processing unit 316 is not fully capable of receiving and transmitting data via the transceiver module 312. The processing unit 316 is, for example, configured to enter an energy saving mode after periods of no communication via the transceiver module 312.

The transceiver module comprises a receiver module 319 and a transmitter module 314. In accordance with previous embodiments of receiver modules, the receiver module 319 comprises a wake-up receiver 200 and a main receiver 318. The wake-up receiver 200, the main receiver 318 and the transmitter module 314 are coupled to the couplers 102. The wake-up module 200 is similar to the wake-up module 200 of FIG. 2 and has similar embodiments. The wake-up module 200 provides a wake-up signal 274 to the main receiver 318 when signals that are received in the predefined spectral range exceed the energy threshold level. The main receiver 318 is configured to operate in a sleep mode and in an operational mode. In the sleep mode, most circuitries of the main receiver 318 are switched off and energy is saved. In the sleep mode, the main receiver 318 detects whether the wake-up signal 274 is received and when the wake-up signal 274 is received the main receiver 318 is configured into the operational mode. In the operational mode, the main receiver 318 is fully operational and the main receiver 318 is capable of receiving data and information via the body transmission channel 160. The main receiver 318 comprises a communication type detector 317 which is configured to analyze signals received from the couplers 102 to detect the communication type identification value (which has been discussed above in the context of the second body coupled communication device 380). Thus, when the wake-up receiver 200 receives enough energy in the predefined spectral range and, subsequently, the main receiver 318 is configured in the operational mode, the remaining part of the wake-up signals transmitted by the second body coupled communication device 380 is received by the main receiver 318 and analyzed by the communication type detector 317. The main receiver 318 may also use a portion of the received wake-up signals to synchronize with the transmitter module 382 of the second body coupled communication device 380.

In an embodiment, as soon as a communication type identification value is detected by the communication type detector 317, a first additional wake-up signal 320 and/or a second additional wake-up signal 322 is generated. The first additional wake-up signal 320 is provided to the main receiver 314 to configure the main receiver 314 in an operational mode. As will be discussed later, the main receiver 314 is also able to operate in a sleep mode and in an operational mode, and the reception of the communication type identification value may be an advantageous trigger for waking up the main receiver 314. The second additional wake-up signal 322 is provided to the processing unit 316 to configure the processing unit 316 in the operational mode. It is to be noted that the communication type detector 317 may just provide simple additional wake-up signal 320, 322 which only indicates to the other modules that they have to wake-up, but the respective additional wake-up signal 320, 322 may also comprise the detected communication type identification value such that, for example, the value may be used to start a specific application or service.

In another embodiment of the main receiver 318, the communication type detector 317 also comprises a data storage (not shown) in which different values of supported communication types are stored—supported means in the context of the invention that the first body coupled communication device 310 is capable of communicating according to the identified communication type. Thus, the first body coupled communication device 310 supports the protocol identified, or is capable of providing or using the identified service, etc. The communication type detector 317 compares the detected communication type identification value with the stored communication types and only when the detected communication type identification value is on the list in the data storage, the first additional wake-up signal 320 and/or the second additional wake-up signal 322 is generated.

The main transmitter 314 is configured to transmit data and/or information via the couplers 102 and, thus, via the body transmission channel 160 when the body of the user is in the direct vicinity of the body of the user 150. The main transmitter 314 is further configured to operate in a sleep mode in which most of the circuitries of the main transmitter 314 are not operational to save energy, and the main transmitter 314 is configured to operate in an operational mode. When the main transmitter 314 receives the first additional wake-up signal 320, the main transmitter 314 switches towards the operational mode in which it is capable of transmitting data signals when being instructed by the processing unit 316 to transmit specific data. In specific embodiment, when the main transmitter 314 is configured in the operational mode, it transmits an acknowledgement signal via the body transmission channel 160 to indicate to the body coupled communication device, which has transmitted the wake-up signals, that the first body coupled communication device 310 is ready for subsequent communication. The acknowledgement signal may also indicate that the transceiver module 312 is capable of handling the specific communication type that was identified in the receiving communication type identification value. In another embodiment, the acknowledgement signal may comprise further data to set up a communication link between the first body coupled communication device 310 and the second body coupled communication device 380. An example of such further data is a public or a private key to set up a secure communication link between the two body coupled communication devices.

Instead of the term processing unit 316, the term microcontroller or microprocessor may be read as well in so far such a microcontroller or microprocessor has the same functions as the processing unit 316. In an embodiment, the processing unit is a unit which is well capable of handling interrupts in the first body coupled communication system. An exemplary interrupt is the wake-up signal 274. Instead of directly providing the wake-up signal 274 to the main receiver 318, the wake-up signal 274 may be provide to the processing unit 316 which handles this interrupt and the processing unit 316 may be configured to control the main receiver 318 in the operational mode. The same applies to the first additional wake-up signal 320.

FIG. 3 also presents some other elements of the exemplary first body coupled communication device 310. The first body coupled communication device 310 may also comprise main memory 326 which may operate in a sleep mode and in an operational mode. At moment in time that circuitries of the body coupled communication device 310 require to access the main memory 326, the processing unit 316 may generate a memory wake-up signal 324 to configure the main memory 326 in the operational mode. When the first body coupled communication device 310 is capable of applying a security encoding/decoding technology, the first body coupled communication device 310 may also comprise a security unit 330 which is configured to encode information to be transmitted and/or decode received information. The security unit 330 is configured to enter a sleep mode or to operate in the operational mode. Such a security unit 330 must only be in the operational mode when the security is applied to the body coupled communication. For example, in certain types of communication, security may be applied, while in other types of communication the information is transmitted via the body transmission channel 160 in a non-encoded manner. In such a situation, the processing unit 316 may be configured to generate en security wake-up signal 328 which is provided to the security unit 330 to configure the security unit 330 in the operational mode.

In an embodiment, a transmitter module for a body coupled communication device is provided. The transmitter module is for transmitting signals via a body communication channel. The transmitter module comprises couplers and a main transmitter.

The couplers are for transmitting signals via the body transmitting which is formed by a body of a user when the body is in the direct vicinity of the couplers. The main transmitter is coupled to the couplers and is configured to transmit wake-up signals in a predefined spectral range for initiating communication with a receiver. The transmitter module of the fourth aspect of the invention creates the possibility for a receiver module, which is coupled with other couplers to the same body transmission channel, to save energy because the receiver module may switch off a portion of the receiver module until the wake-up signals are received. The transmitter module may indicate to receiver modules of other body coupled communication devices that it has the intention to start communication via the body transmission channel by transmitting the wake-up signals. Optionally, the main transmitter of the transmitter module is further configured to transmit a communication type identification value as part of the wake-up signals. The communication type identification value identifies a specific communication type of the forthcoming communication via the body transmission channel. Thus, the main transmitter is configured to indicate to other device what type of communication it is intended to start. This allows other device to decide whether they want to participate in this communication or not. This allows the other devices to save energy when they detect that they cannot or are not willing to participate in the indicated type of communication.

Figure 4A:
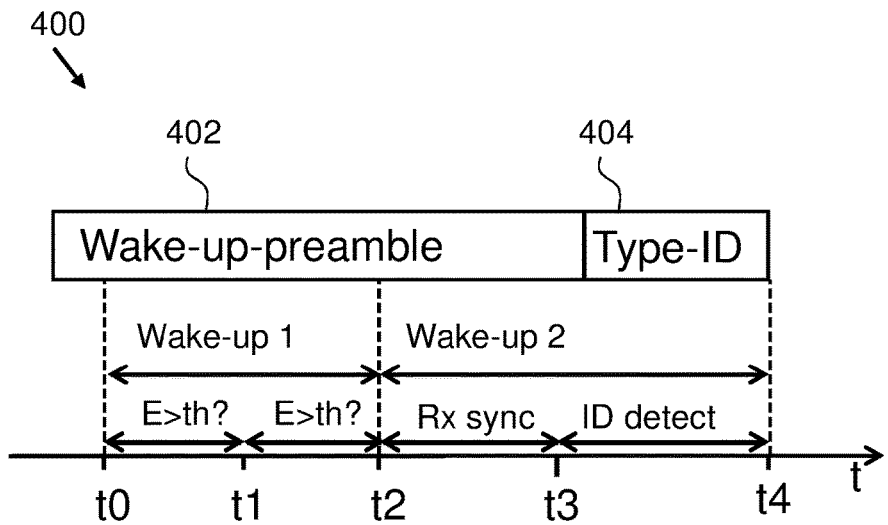

FIG. 4a schematically shows a signal 400 transmitted by a transmitter module and intervals of time related to the operation of a receiver module. At the top end of FIG. 4a, the signal 400 is presented in the format of a (data-) packet. The signal 400 is subdivided in a wake-up-preamble signal 402 and the type-ID signal 404. The wake-up-preamble signal 402 comprises a signal to wake-up the main receiver of the device that is going to receive the signal 400. An example of the wake-up-preamble is, for example, a simple sinusoidal signal at a particular frequency, for example, 100 kHz. In many practical embodiments, the receiver of the signal 400 has to synchronize a main receiver, which is going to detect a communication type identification value, to the transmitter. The wake-up-preamble signal 402 is also suitable for such a synchronization. Therefore, in practical embodiments, the length of the wake-up-preamble signal 402 is long enough to wake-up the main receiver of the receiving device and to allow the synchronization of the main receiver with the transmitter of the wake-up-preamble signal 402. Subsequently, the type-ID signal 404 comprises the communication type identification value. In the type-ID signal 404 the communication type identification value is modulated in the signal. For example, amplitude modulation at 100 kHz is used.

At the bottom end of FIG. 4a a time line is drawn with moments of time t0 to t4. At t0 the wake-up receiver of a body coupled communication device (such as wake-up receiver 200 of FIG. 2), which receives the signal 400, starts an interval of time. This time period ends at t1. In between t0 and t1, the wake-up receiver checks whether the total amount of energy of the received signals in a predefined spectral range (the range in which the wake-up signals are transmitted) is larger than the energy threshold value. If this is the case, in a subsequent interval this is checked once again before a wake-up signal is generated. Thus, at t1 the wake-up receiver resets the energy detection circuit and checks in between t1 and t2 whether the total amount of energy received in the predefined spectral range is larger than the energy threshold level. If, in this specific embodiment, the total amount of energy is larger than the energy threshold value in two subsequent intervals of time, the wake-up receiver generates the wake-up signal at t2 and provides the wake-up signal to the main receiver (such as, for example, the main receiver 318 of FIG. 3) which is subsequently switched into the operational mode. The time phase from t0 to t2 is the first wake-up phase. In the second wake-up phase, which is from t2 to t4, the main receiver first synchronizes with the received wake-up-preamble signal 402 during the period of time starting at t2 and ending at t3. When the main receiver is synchronized with the transmitter, the main receiver tries to detect the communication type identification value (transmitted in the Type-ID signal 404). This is done starting from moment t3 and at t4, when the Type-ID signal 404 ends, the communication type identification value is detected and the main receiver generates an additional wake-up signal to wake-up the main transmitter and/or the processing unit of the body coupled communication device which comprises this main receiver. Thus, at t4 the second wake-up phase has been ended.

Figure 4B:
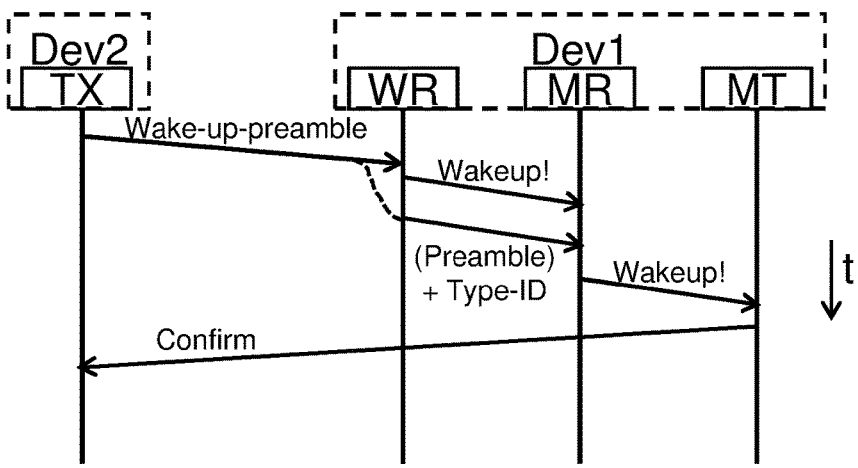

FIG. 4b schematically shows a transmission and reception of signals between different components of a body coupled communication system. In the horizontal direction different components of different body coupled communication devices are shown. At the left end a vertical line represents the main transmitter TX of the second body coupled communication device Dev2 (for example, the second body coupled communication device 380 of FIG. 3). At the right half of FIG. 4b three vertical lines represent, respectively, the wake-up receiver WR, the main receiver MR and the main transmitter MT of the first body coupled communication device (for example, the first body coupled communication device 310 of FIG. 3). The vertical direction presents the dimension of time.

Initially, the main receiver TX of the second body coupled communication device Dev2 transmits the signal 400 of FIG. 4a via a body transmission channel. The first body coupled communication device Dev1 which is together with the second body coupled communication device Dev2 in the direct vicinity of a body of a user, receives the transmitted signal 400. Initially, only the wake-up receiver WR of the first body coupled communication device Dev1 is switched on and receives the transmitted wake-up signal. Especially, the wake-up-preamble signal 402 is received by the wake-up receiver WR and when the wake-up receiver WR has detected in two or more consecutive intervals of time that the received total amount of energy is larger than the energy threshold level, the wake-up receiver WR generates a main receiver wake-up signal (which was named the wake-up signal 274 in the discussions of FIG. 1 to FIG. 3) and provides the main receiver wake-up signal to the main receiver MR. The main receiver MR is configured in the operational mode when receiving the main receiver wake-up signal. The transmission of the signal 400 has not yet been ended, which means that the main receiver MR receives the last part of the signal 400 which may comprise a remaining portion of the wake-up-preamble signal 402 and which comprises at least the Type-ID signal 404. The remaining portion of the wake-up-preamble may be used to synchronize the main receiver MR of the first body coupled communication device Dev1 with the main transmitter TX of the second body coupled communication device Dev2. The Type-ID signal 404 is demodulated by the main receiver MR and, consequently, the communication type identification value is detected. When the communication type identification value is detected, a main transmitter wake-up signal (the first additional wake-up signal 320 in the discussions of FIG. 1 to FIG. 3) is generated by the main receiver MR and provided to the main transmitter MT to configure the main transmitter MT in the operational mode. When the main transmitter MT is in the operational mode, it sends a confirmation signal to the main transmitter TX of the second body coupled communication device Dev2. It is also to be noted that the main receiver MR of the first body coupled communication device Dev1 may first check whether the detected communication type identification value relates to a communication type that is supported by the first body coupled communication device Dev1 before the main receiver wake-up signal is generated. It is to be noted that the main receiver may also, or alternatively, generate a processing unit wake-up signal (not shown) and provide the processing unit wake-up signal to a processing unit (now shown) of the first body coupled communication device Dev1.

In FIG. 4a and FIG. 4b it has been assumed that, when the second body coupled communication device Dev2 transmits the signal 400, the signal 400 is directly, for the first time, correctly received by the wake-up receiver WR and/or main receiver MR of the first body coupled communication device Dev1. It might be that the second body coupled communication device Dev2 and/or first body coupled communication device Dev1 is not yet in the direct vicinity of the body of the user, and, thus, that the signal 400 is not yet received by the wake-up receiver WR and/or the main receiver MR of the first body coupled communication device Dev1. In practical embodiments, as long as the second body coupled communication device Dev2 did not receive a confirmation signal, the main transmitter TX of the second body coupled communication device Dev2 regularly transmits the signal 400 when the second body coupled communication device Dev2 wants to initiate communication with another body coupled communication device. Reference is made to US patent application US2012/0033584 in which micro-preambles are regularly transmitted to initiate communication.

Figure 5:
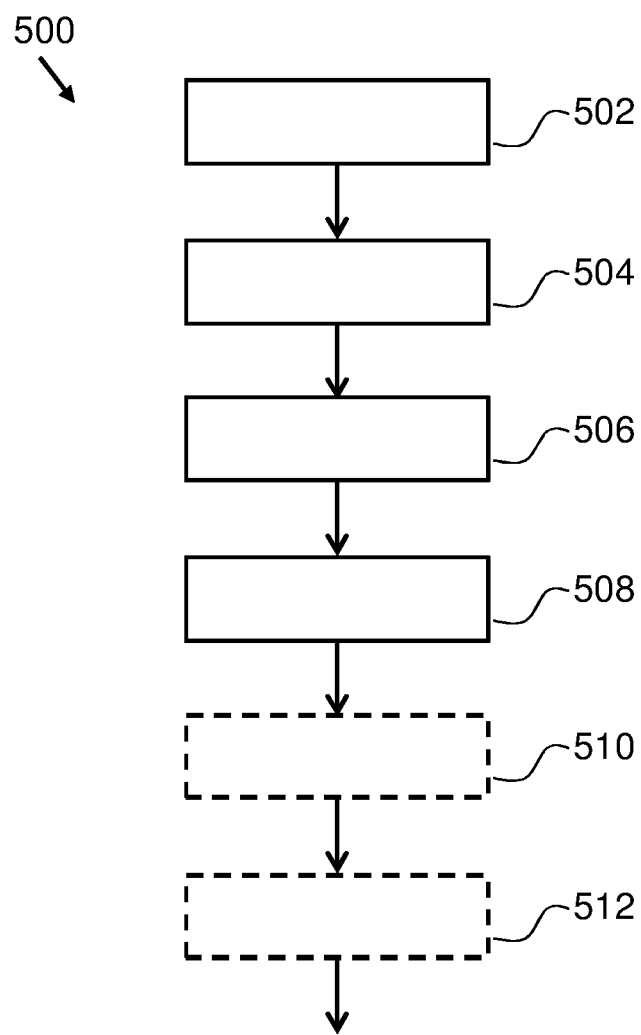

FIG. 5 schematically shows an embodiment of a method 500 of waking-up a body coupled receiver of a body coupled communication device. The body coupled receiver is configured to operate in a sleep mode and to operate in an operational mode and the body coupled receiver is configured to receive data via signals transmitted via a body transmission channel which follows a body of a user. The method comprises the stages of: i) receiving 502 signals from the body transmission channel, the signals are received at couplers of the body coupled communication device, the couplers are configured to receive signals via the body transmission channel when the user is in the direct vicinity of the couplers, ii) filtering 504 the received signals to obtain a filtered signal which comprises the spectral components of the received signals in a predefined spectral range which relates to wake-up signals being transmitted via the body coupled transmission channel, iii) detecting 506 on basis of the filtered signal whether the received signals in the predefined spectral range exceed an energy threshold level, iv) providing 508 a wake-up signal to the body coupled receiver to configure the body coupled receiver in the operational mode. The body coupled communication device optionally comprises at least a further circuitry which is configured to operate in a sleep mode and which is configured to operate in an operational mode. The method optionally comprises the further stages: v) detecting 510 a communication type identification value in the filtered signal, the communication type identification value indicating a specific communication type of a forthcoming communication via the body transmission channel, vi) providing 512 a further wake-up signal to the further circuitry to configure the further circuitry in the operational mode.

In an optional embodiment, a computer program is provided which comprises instructions for causing a processor system to perform the above method. Optionally, the computer program is embodied on a computer readable medium In summary, the invention provides a receiver module, a transmitter module, transceiver module for body coupled communication devices and a method of waking-up a body coupled receiver of a body coupled communication device. The receiver module of the body coupled communication device comprises couplers for receiving signals via a body transmission channel which follows a body of a user. A wake-up receiver and a main receiver of the receiver module are coupled to the couplers. The main receiver may operate in a sleep mode and in an operational mode. The wake-up receiver generates a wake-up signal when signals received via the body transmission channel in a predefined spectral range exceed an energy threshold level. The wake-up signal is provided to a circuitry of the body coupled communication device to directly or indirectly configuring the main receiver in the operational mode.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A receiver module for a body coupled communication device and adapted to receive signals via a body transmission channel, the receiver module comprising:
   a plurality of couplers for receiving the signals from the body transmission channel being formed by a body of a user when the body is in a direct vicinity of the couplers,
   a main receiver being coupled to the couplers, wherein the main receiver is configured to receive data via the signals transmitted via the body transmission channel, the main receiver being configured to operate in a sleep mode and an operational mode,
   a wake-up receiver being coupled to the couplers, wherein the wake-up receiver is configured to provide a wake-up signal to a circuit of the body coupled communication device for configuring the main receiver in the operational mode, wherein
   the wake-up receiver comprises a band-pass filter for allowing the signals to pass in a predefined spectral range related to wake-up signals transmitted via the body transmission channel,
   the wake-up receiver is configured to generate the wake-up signal when an energy of the signals received by the couplers in the predefined spectral range exceeds an energy threshold level, and
   the wake-up receiver comprises an energy reception level detector being configured to detect whether a total amount of the energy of the signals received by the couplers in the predefined spectral range during an interval of time exceeds the energy threshold level;
   wherein the wake-up receiver comprises a controller being configured to generate the wake-up signal when the energy reception level detector detects that the threshold level is exceeded.

2. The receiver module according to claim 1, wherein the controller is configured to generate the wake-up signal only when the energy reception level detector detects in two or more consecutive intervals of time that the total amount of received energy of the signals in the predefined spectral range exceeds the threshold level.

3. The receiver module according to claim 1 wherein the controller is configured to detect from the start of the interval of time within how many units of time the total amount of received energy of the signals in the predefined spectral range exceeds the threshold level.

4. The receiver module according to claim 3, wherein the controller is configured to generate a received signal strength indication signal based on a number of units of time between the start of the interval of time and a moment of time at which the total amount of received energy of the signals in the predefined spectral range exceeds the threshold level.

5. The receiver module according to claim 1, wherein the controller is configured to estimate the amount of noise or interference signals in the predefined spectral range during a period of time in which no wake-up or data signals are transmitted via the body transmission channel by detecting from the start of a sub-interval of time of the period of time within how many units of time the total amount of received energy of the signals in the predefined spectral range exceeds a further threshold level, wherein the length of the sub-interval of time is longer than the interval of time or the further threshold level is lower than the threshold level.

6. The receiver module according to claim 1, wherein the main receiver is configured to analyze the signals received from the couplers to detect a communication type identification value indicating a specific communication type of a forthcoming communication via the body transmission channel, the main receiver is further configured to provide an additional wake-up signal for configuring other circuits of the body coupled communication device in the operational mode when the specific communication type identification value is detected.

7. The receiver module according to claim 6, wherein the communication type identification value indicates one of:
   a protocol to be used in the forthcoming communication,
   a provided service via the forthcoming communication,
   a service to be used in the forthcoming communication, and
   a security level of the forthcoming communication.

8. The receiver module according to claim 6, wherein the main receiver comprises a data storage for storing a list of communication type identification values of communication types supported or provided by the body coupled communication device that comprises the receiver module, and the main receiver is configured to generate the additional wake-up signal only when the communication type identification value is present on the list of communication type identification values.

9. The receiver module according to claim 1, wherein the predefined spectral range is below a carrier frequency used for communicating data via the body transmission channel.

10. A transceiver module for a body coupled communication device and for receiving and transmitting signals via a body transmission channel, the transceiver module comprising:
   a receiver module comprising:
      a plurality of couplers for receiving the signals from the body transmission channel being formed by a body of a user when the body is in a direct vicinity of the couplers;
      a main receiver being coupled to the couplers, wherein the main receiver is configured to receive data via the signals transmitted via the body transmission channel, the main receiver being configured to operate in a sleep mode and an operational mode;
      a wake-up receiver being coupled to the couplers, wherein the wake-up receiver is configured to provide a wake-up signal to a circuit of the body coupled communication device for configuring the main receiver in the operational mode, wherein the wake-up receiver comprises a band-pass filter for allowing the signals to pass in a predefined spectral range related to wake-up signals transmitted via the body transmission channel, the wake-up receiver is configured to generate the wake-up signal when an energy of the signals received by the couplers in the predefined spectral range exceeds an energy threshold level, and the wake-up receiver comprises an energy reception level detector being configured to detect whether a total amount of the energy of the signals received by the couplers in the predefined spectral range during an interval of time exceeds the energy threshold level, and wherein the couplers are also for transmitting signals via the body transmission channel; and
   a main transmitter being coupled to the couplers, the main transmitter being configured to transmit data via the signals transmitted via the body transmission channel, the main transmitter being configured to operate in a sleep mode and an operational mode;
   wherein the wake-up receiver comprises a controller being configured to generate the wake-up signal when the energy reception level detector detects that the threshold level is exceeded.

11. The transceiver module according to claim 10, wherein
   the main transmitter receives the wake-up signal, and the main transmitter is configured to operate in the operational mode when the wake-up signal is received, or
   the main transmitter receives the additional wake-up signal, and the main transmitter is configured to operate in the operational mode when the additional wake-up signal is received.

12. The transceiver module according to claim 11, wherein the main transmitter is configured to transmit an acknowledgement signal via the body transmission channel in the operational mode, wherein the acknowledgement signal indicates that the transceiver module is ready for subsequent communication or the acknowledgement signal indicates that the transceiver module is capable of handling a specific communication type being identified by a received communication type identification value.

13. A body coupled communication device, comprising:
   a transceiver module comprising:
      a receiver module that includes:
         a plurality of couplers for receiving the signals from the body transmission channel being formed by a body of a user when the body is in a direct vicinity of the couplers;
         a main receiver being coupled to the couplers, wherein the main receiver is configured to receive data via the signals transmitted via the body transmission channel, the main receiver being configured to operate in a sleep mode and an operational mode;
         a wake-up receiver being coupled to the couplers, wherein the wake-up receiver is configured to provide a wake-up signal to a circuit of the body coupled communication device for configuring the main receiver in the operational mode, wherein the wake-up receiver comprises a band-pass filter for allowing the signals to pass in a predefined spectral range related to wake-up signals transmitted via the body transmission channel, the wake-up receiver is configured to generate the wake-up signal when an energy of the signals received by the couplers in the predefined spectral range exceeds an energy threshold level, and the wake-up receiver comprises an energy reception level detector being configured to detect whether a total amount of the energy of the signals received by the couplers in the predefined spectral range during an interval of time exceeds the energy threshold level, and wherein the couplers are also for transmitting signals via the body transmission channel; and
      a main transmitter being coupled to the couplers, the main transmitter being configured to transmit data via the signals transmitted via the body transmission channel, the main transmitter being configured to operate in a sleep mode and an operational mode,
   a processing unit for processing the data received by or the data to be transmitted via the transceiver module, wherein the processing unit is configured to operate in the sleep mode and the operational mode, and wherein the processing unit receives the wake-up signal, and the processing unit is configured to operate in the operational mode when the wake-up signal is received, or the processing unit receives the additional wake-up signal, and the processing unit is configured to operate in the operational mode when the additional wake-up signal is received;

wherein the wake-up receiver comprises a controller being configured to generate the wake-up signal when the energy reception level detector detects that the threshold level is exceeded.

14. A method of waking-up a body coupled receiver of a body coupled communication device, the body coupled receiver being configured to operate in a sleep mode and an operational mode, and the body coupled receiver being adapted to receive data via signals transmitted via a body transmission channel formed by a body of a user, the method comprising:

receiving signals from the body transmission channel, wherein the signals are received at a plurality of couplers of the body coupled communication device, and the couplers are configured to receive signals via the body transmission channel when the user is in a direct vicinity of the couplers, filtering the received signals to obtain a filtered signal which comprises the spectral components of the received signals in a predefined spectral range which relates to wake-up signals that are transmitted via the body coupled transmission channel, detecting on a basis of the filtered signal whether a total amount of energy of the received signals in the predefined spectral range received during an interval of time exceeds an energy threshold level, when detecting that the total amount of energy of the received signals exceeds the energy threshold level, providing a wake-up signal to the body coupled receiver to configure the body coupled receiver in the operational mode;

wherein the wake-up signal is provided by a controller of a wake-up receiver.

15. The method according to claim 14, wherein the body coupled communication device comprises at least a further circuitry which is configured to operate in the sleep mode and the operational mode, the method further comprising:

detecting a communication type identification value in the filtered signal, the communication type identification value indicating a specific communication type of a forthcoming communication via the body transmission channel, and providing a further wake-up signal to the further circuitry to configure the further circuitry in the operational mode.

* * * * *